(12) United States Patent
Chambers et al.

(10) Patent No.: US 7,433,968 B2
(45) Date of Patent: Oct. 7, 2008

(54) METHODS AND SYSTEMS FOR MANAGEMENT AND CONTROL OF AN AUTOMATION CONTROL MODULE

(75) Inventors: Misty McCrea Chambers, Barboursville, VA (US); David J. Hietanen, Charlottesville, VA (US); William Todd Shelton, Scottsville, VA (US)

(73) Assignee: GE FANUC Automation North America, Inc., Charlottesville, VA (US)

( * ) Notice: Subject to any disclaimer, the term of this patent is extended or adjusted under 35 U.S.C. 154(b) by 218 days.

(21) Appl. No.: 10/388,147

(22) Filed: Mar. 12, 2003

(65) Prior Publication Data

US 2004/0181297 A1   Sep. 16, 2004

(51) Int. Cl.
G06F 15/177   (2006.01)
(52) U.S. Cl. .................. 709/241; 700/31; 709/221
(58) Field of Classification Search .......... 700/292, 700/20, 19, 22, 2, 1, 18, 86, 87, 108, 169, 700/174, 79, 83, 76, 9, 31, 30; 718/1, 100; 709/218, 217, 223, 219, 206, 207, 224, 212, 709/246, 25
See application file for complete search history.

(56) References Cited

U.S. PATENT DOCUMENTS

| | | | |
|---|---|---|---|
| 6,061,603 A * | 5/2000 | Papadopoulos et al. ........ 700/83 |
| 6,256,666 B1 * | 7/2001 | Singhal ...................... 709/217 |
| 6,560,639 B1 * | 5/2003 | Dan et al. .................... 709/218 |
| 6,665,822 B1 * | 12/2003 | Conway ....................... 714/47 |
| 6,782,436 B1 * | 8/2004 | Baker .......................... 710/43 |
| 6,788,980 B1 * | 9/2004 | Johnson ........................ 700/1 |
| 6,854,120 B1 * | 2/2005 | Lo et al. ...................... 719/311 |
| 6,880,126 B1 * | 4/2005 | Bahrs et al. .................. 715/526 |
| 6,904,460 B1 | 6/2005 | Raciborski et al. |
| 2002/0169871 A1 * | 11/2002 | de Almeida et al. ......... 709/224 |

* cited by examiner

Primary Examiner—Kidest Bahta
(74) Attorney, Agent, or Firm—Mark A. Conklin, Esq.; Armstrong Teasdale LLP

(57) ABSTRACT

An automation control module (ACM) includes an ACM central processing unit (CPU) and a file transfer system electrically connected to the ACM CPU. The file transfer system is embedded within the ACM, and is configured to receive at least one update for at least one module from a network and transfer the at least one update to the at least one module.

50 Claims, 2 Drawing Sheets

METHODS AND SYSTEMS FOR MANAGEMENT AND CONTROL OF AN AUTOMATION CONTROL MODULE

BACKGROUND OF THE INVENTION

This invention relates generally to automation control modules (ACMs) and more particularly to management and control of ACMs.

At least some known ACM systems are used in process control applications for monitoring input signals from a variety of inputs that report events and conditions occurring in a controlled process. For example, an ACM system may monitor input conditions such as motor speed, temperature, pressure, volumetric flow, as well as other operating conditions. A user program and pertinent data are stored in a memory within the ACM system to instruct the ACM system regarding what actions to take upon encountering particular input signals or conditions. In response to the input signals, the ACM system derives and generates output signals that are transmitted to various output devices to control the process. For example, based on the input signals, the ACM system may issue output signals to speed up or slow down a motor, open or close a relay, and to raise or lower operating temperatures or pressures.

An ACM system generally includes at least one option module. For example, at least some known ACM systems include an input module that performs input functions or an input/output (I/O) module that performs input/output functions. Each module includes a plurality of input/output points. The modules are coupled through an interface bus, for example via a backplane, to a microprocessor used to execute a user program. The combination of the particular main controller, or processor, used in the ACM system and the particular choice of modules installed are often referred to as the hardware configuration of the ACM system. The hardware configuration may also include the particular addresses which the modules employ.

Any number of modules may be employed within an ACM system and the control tasks distributed among the modules. The main controller may also be in modular form. Modules may also include a microprocessor and a memory containing separate user programs and data directed to a particular operation of the ACM system. These separate user programs and data may consist of both a manufacturer component and a user component. Furthermore, these separate user programs are conventionally fixed at time of manufacture or are modifiable by the user through some local input device of the module. When a option module has separate user programs and data, information is exchanged between the main controller and the modules of the ACM system. More specifically, commands and data are exchanged between the modules and the main controller utilizing a backplane or interconnecting cabling to allow the system to operate in a coordinated fashion.

BRIEF DESCRIPTION OF THE INVENTION

In one aspect, an automation control module (ACM) is provided including an ACM central processing unit (CPU) and a file transfer system electrically connected to the ACM CPU. The file transfer system is configured to receive at least one update for at least one module from a network and transfer the at least one update to at least one module.

In another aspect, an automation control module (ACM) system is provided. The ACM system includes an ACM, a network, at least one module electrically connected to the ACM, a computer electrically connected to the network and configured to communicate with the network, and a file transfer subsystem electrically connected to the ACM and the network. The file transfer subsystem is configured to receive at least one update for at least one module from the computer using the network and transfer at least one update for the at least one module to the at least one module.

In yet another aspect, a method is provided for management and control of an automation control module (ACM) using an ACM system. The ACM system includes an ACM, a network, a computer electrically connected to the network and configured to communicate with the network, at least one module electrically connected to the ACM, and a file transfer subsystem. The method includes receiving at least one update for at least one module from the computer using the network and the file transfer subsystem, and transferring the at least one update for at least one module to at least one module using the file transfer subsystem.

In a further aspect, an automation control module (ACM) is provided. The ACM includes an ACM central processing unit (CPU), an ACM CPU system memory, and a file transfer system electrically connected to the ACM CPU. The system is configured to receive at least one update for the ACM from a network and transfer at least one update to at least one of ACM CPU and the ACM CPU system memory.

DETAILED DESCRIPTION OF THE INVENTION

Set forth below are descriptions of embodiments of methods and systems for control and management of an automation control module (ACM). The methods and systems facilitate updating option modules using a standard communications network where the specific option module(s) being updated may or may not be directly connected to the network.

The methods and systems are not limited to the specific embodiments described herein. In addition, components of each system and steps of each method can be practiced independent and separate from other components and steps described herein. Each component and step can also be used in combination with other components and steps.

As used herein, the term ACM refers to any device used to control the automation of an activity, including but not limited to PLCs, computer numeric controls (CNCs), motion control products, home automation products, and commercial automation products, for example controls for automated teller machines or car wash systems. As used herein, the term module refers to any option module for an ACM system, for example, an input/output (I/O) module, an input module, or an output module. As used herein, the term update refers to updates for modules, for example, a module firmware update, a module program update, or a module data update. As used herein, computer refers to any electronic device capable of storing, retrieving, and processing data.

Figure 1:
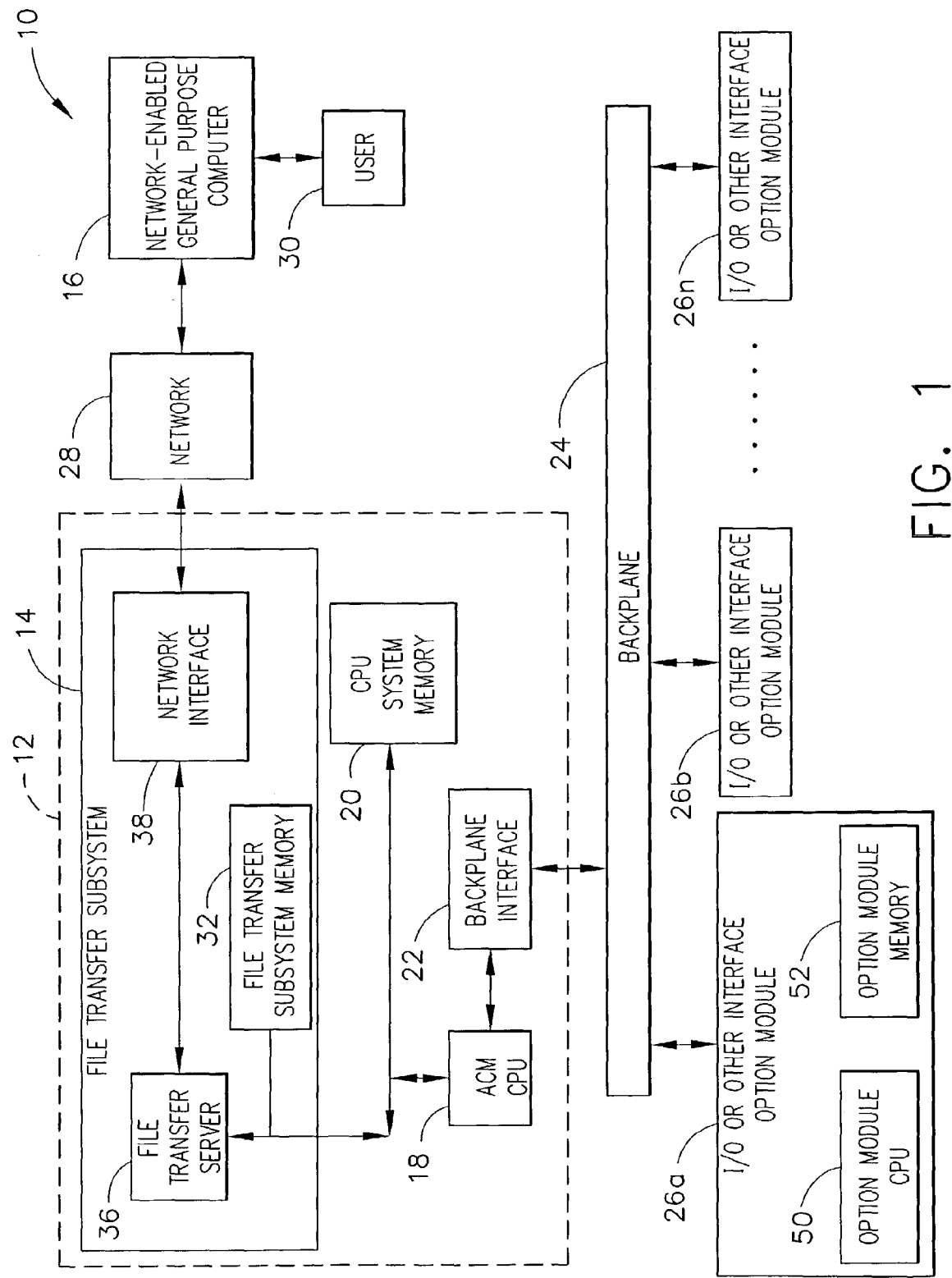
FIG. 1 is a block diagram illustrating one embodiment of an ACM system of the present invention.

FIG. 1 illustrates, in block diagram form, hardware architectures that can be utilized in conjunction with an ACM management and control system. The system can be implemented on many different platforms and utilize many different architectures. The architectures illustrated in FIG. 1 are exemplary only.

FIG. 1 is a block diagram illustrating one embodiment of ACM system 10. System 10 includes an ACM 12, a file transfer subsystem 14, and a computer 16. ACM 12 includes an ACM CPU 18 that carries out ACM functions, for example user logic and function block executions, input/output (I/O) scanning, and communications to other devices. ACM CPU 18 includes a CPU system memory 20 electrically connected to CPU 18 and, in one embodiment, contains both the operating system (not shown) for ACM CPU 18 and a user's program and data.

In one embodiment, an ACM backplane interface 22 is connected to ACM CPU 18, and provides an interface between ACM CPU 18 and an ACM backplane 24 connected to interface 22. ACM backplane 24 provides a physical and electrical means for connecting various option modules 26, for example, I/O, input, or other modules 26, for example communications or motion modules, into ACM 12. ACM backplane 24 facilitates the exchange of data between modules 26 and ACM CPU 18. In one embodiment, one or more modules 26 provide an interface for real world inputs (not shown), such as limit or proximity switch status, position of an object, temperature, or pressure, to ACM CPU 18 as parameters for user program execution. In another embodiment, one or more modules 26 provide an interface to real world outputs (not shown) as commanded by ACM CPU 18 to control output devices (not shown), such as actuators, contactors, or solenoids. Although FIG. 1 illustrates three modules 26, it will be understood that ACM system 10 may include more or fewer option modules.

In an alternative embodiment (not shown), interfaces (not shown) other than backplane 24 can be utilized as a physical and electrical means for connecting modules 26 into ACM 12 and for exchanging data between modules 26 and ACM CPU 18. For example, and in one embodiment, ACM 12 includes an external interface (not shown) electrically connected to said ACM CPU 18. In such an embodiment, a cable (not shown) provides electrical connection and communication between modules 26 and the external interface. Although hereinafter all embodiments will be described in combination with a backplane connection between modules 26 and ACM 12, it will be understood that the above alternative method, in addition to other suitable methods, may be practiced.

Network-enabled computer 16 is electrically connected to a network 28. Network 28 includes the physical medium and intermediate devices (not shown), such as routers, and switches, that connect computer 16 to ACM 12. In one embodiment, network 28 is a wide area network (WAN), such as the Internet. In an alternative embodiment, network 28 is a local area network (LAN), such as an Intranet. A user 30 accesses, such as dialing into, or directly logging onto, an Intranet or the Internet to gain access to ACM 12. Computer 16 is interconnected to the Network through many interfaces including a different network (not shown), such as a WAN or a LAN, dial in connections, cable modems and special high-speed ISDN lines. Computer 16 is any device capable of interconnecting to the Network, including a web-based telephone or other web-based connectable equipment. In one embodiment, user 30 must enter a valid user name and valid user password to access ACM 12 and file transfer subsystem 14. The user name and user password correspond to a user profile stored in a file transfer subsystem memory 32, or alternatively, in ACM CPU system memory 20.

File transfer subsystem 14 is electrically connected to ACM CPU 18, CPU system memory 20, and network 28. Subsystem 14 is shown in FIG. 1 to be embedded within ACM 12. In an alternative embodiment, subsystem 14 is contained in a separate module connected to backplane 24. File transfer subsystem 14 includes memory 32, a file transfer server 36 electrically connected to ACM CPU 18, and a network interface 38 that provides the lower level protocols (e.g., TCP/IP, IPX, or token-ring) and physical hardware connections to network 28. File transfer server 36 is electrically connected to memory 32 and network interface 38, and transfers module updates and associated elements between modules 26 and computer 16. In one embodiment, file transfer server 36 is a file transfer protocol server.

Using computer 16, a user 30 sends program and/or data updates for a module 26 through network 28 and network interface 38 to file transfer subsystem 14. File transfer server 36 receives the updates from network interface 38. The updates are then, in one embodiment, stored in at least one of file transfer server 36, memory 32, and a CPU system memory 20. In some embodiments, file transfer subsystem 12 may not include memory 32. Furthermore, and in one embodiment, memory 32 is embedded within file transfer server 36. File transfer server 36 then retrieves the updates and transfers the updates through ACM CPU 18, backplane interface 22, and backplane 24 to module 26. Alternatively, the updates are not stored in any of file transfer server 36, memory 32, or CPU system memory 20 prior to transfer to module 26. Furthermore, and in another embodiment, the updates may be transferred to ACM CPU system memory 20 and/or ACM CPU 18. In one embodiment, one or more of modules 26 includes a CPU 50 and a module memory 52. Module memory 52 may contain a module program and/or module data related to a task or tasks of module 26. In one embodiment, memory 52 is at least one of a RAM and a ROM. In an alternative embodiment, memory 52 includes both a ROM component and a RAM component. Using CPU 50 and memory 52, module 26 uses the updates transferred by server 36 to update one or more module programs and/or module data stored within memory 52. In one embodiment, CPU system memory 20 and/or ACM CPU 18 use an update transferred from server 36 to update an ACM program and/or ACM data related to a task or tasks of CPU 18.

Figure 2:
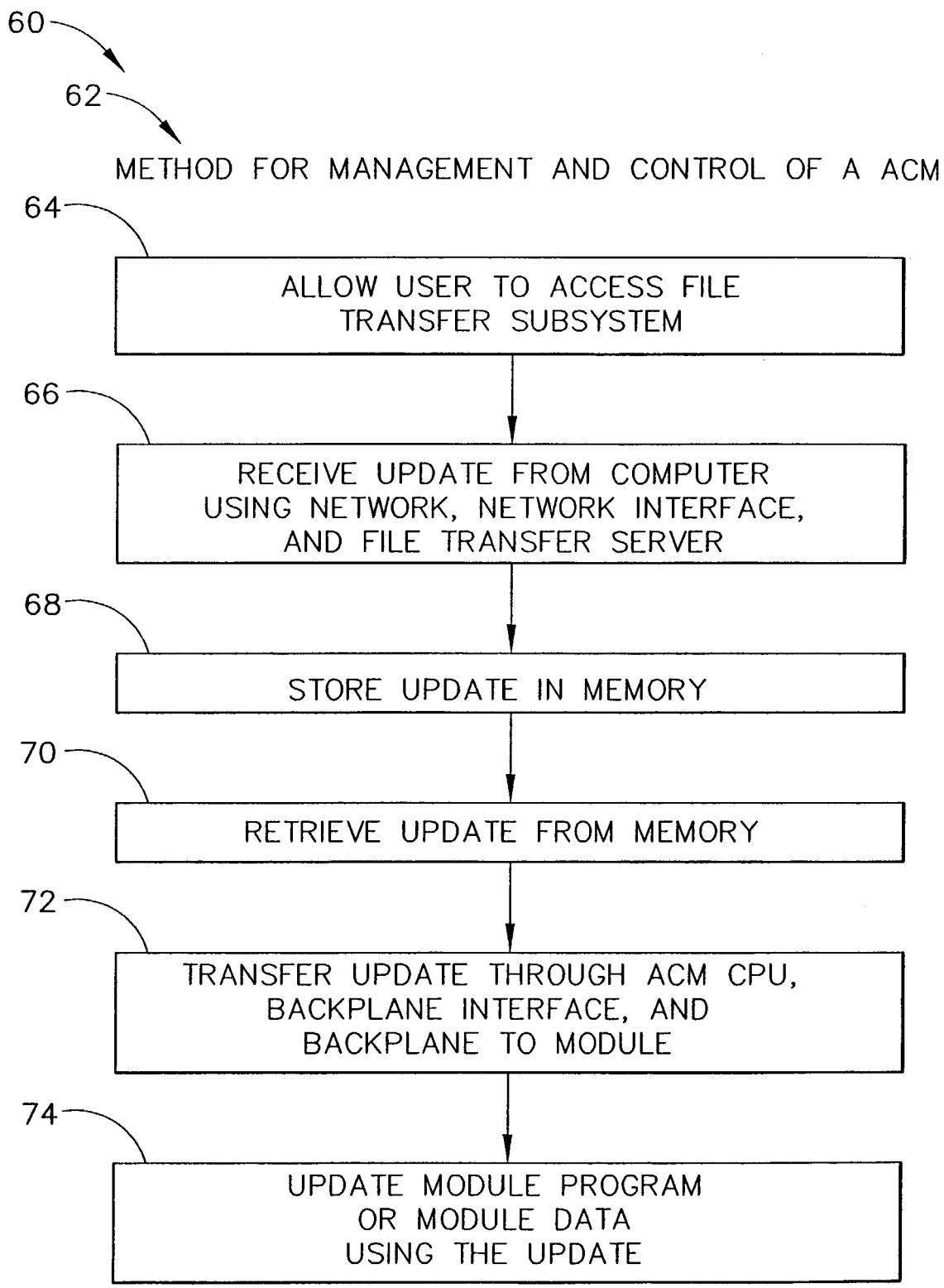
FIG. 2 is a flow chart illustrating one embodiment of a method for management and control of an automation control module using an ACM system.

FIG. 2 is a flow chart 60 illustrating a method 62 for management and control of ACM 12 (shown in FIG. 1). Method 62 includes allowing 64 a user 30 to access file transfer subsystem 14 using computer 16, and receiving 66 an update for a module 26 from computer 16 using network 28, network interface 38, and file transfer server 36. In one embodiment, file transfer server 36 stores 68 the update in memory 32 and later retrieves 70 the update from memory 32. File transfer server 36 then transfers 72 the update through ACM CPU 18, backplane interface 22, and backplane 24 to module 26, and thereafter, module 26 updates 74 a module program and/or module data using the update.

ACM system 10 facilitates the receival of module updates through a single point within an ACM system, and through a standard communications network. Accordingly, ACM system 10 facilitates reducing the effort and cost required to update ACM system option modules. In addition, ACM system 10 facilitates rapid updates to ACM modules using standard devices such as computer 16 or PDA via a standard network.

While the invention has been described in terms of various specific embodiments, those skilled in the art will recognize that the invention can be practiced with modification within the spirit and scope of the claims.

What is claimed is:

1. An automation control module (ACM) comprising:
    an ACM central processing unit (CPU) including a programmable logic controller (PLC) and an ACM CPU memory; and a file transfer system comprising a file transfer system memory, said file transfer system electrically connected to said ACM CPU and embedded within said ACM, and configured to receive at least one update for at least one module from a network and transfer said at least one update to the at least one module without user intervention, wherein the at least one module is configured to apply the at least one update to one of a program and a firmware within the at least one module, wherein said file transfer system is configured to automatically transfer the at least one update via a backplane to update one of the firmware and the program using a file transfer protocol.

2. An ACM in accordance with claim 1 wherein said file transfer system further comprises a file transfer server electrically connected to said ACM CPU and the network, said file transfer server configured to receive the at least one update for the at least one module from the network.

3. An ACM in accordance with claim 2 wherein said file transfer server configured to transfer said at least one update for at least one module to the at least one module.

4. An ACM in accordance with claim 1 wherein said at least one update for at least one module comprises at least one of a program and data.

5. An ACM in accordance with claim 1 wherein the at least one module comprises at least one of an input module, an output module, and an input/output (I/O) module.

6. An ACM in accordance with claim 2 wherein said file transfer server configured to store said at least one update for at least one module.

7. An ACM in accordance with claim 2 wherein said file transfer system memory is electrically connected to said file transfer server, said file transfer system memory configured to store said at least one update for at least one module and comprising said at least one update for at least one module, said file transfer server configured to retrieve said at least one update for at least one module from said file transfer system memory.

8. An ACM in accordance with claim 2 wherein said ACM CPU memory is electrically connected to said file transfer server, said ACM CPU memory configured to store said at least one update for at least one module and comprising said at least one update for at least one I/O module, said file transfer server configured to retrieve said at least one update for at least one module from said ACM CPU memory.

9. An ACM in accordance with claim 7 wherein said file transfer system memory comprises at least one of a read only memory (ROM), a random access memory (RAM), a removable memory, a flash memory, and a compact flash card.

10. An ACM in accordance with claim 8 wherein said ACM CPU memory comprises at least one of a read only memory (ROM), a random access memory (RAM), a removable memory, a flash memory, and a compact flash card.

11. An ACM in accordance with claim 2 wherein said file transfer system comprises a network interface electrically connected to said file transfer server and configured for connection to a network, said file transfer server configured to receive said at least one update for at least one module from the network using said network interface.

12. An ACM in accordance with claim 1 wherein said ACM comprises a backplane interface electrically connected to said ACM and the backplane electrically connected to said backplane interface, said backplane configured for connection with the at least one module.

13. An ACM in accordance with claim 1 wherein said ACM comprises an external interface electrically connected to said ACM and a cable electrically connected to said external interface, said cable configured for connection with the at least one module.

14. An ACM in accordance with claim 11 wherein said file transfer server configured to send said at least one update for at least one module to said network using said network interface.

15. An ACM in accordance with claim 1 wherein said file transfer system embedded within said ACM.

16. An ACM in accordance with claim 1 wherein said ACM comprises a backplane interface electrically connected to said ACM and the backplane is electrically connected to said backplane interface, said backplane configured for connection with said file transfer system.

17. An ACM in accordance with claim 1 wherein the network comprises the Internet.

18. An automation control module (ACM) system comprising:
    an ACM including a programmable logic controller (PLC) and an ACM system memory;
    a network;
    at least one module electrically connected to said ACM, wherein said at least one module includes a first module and a second module;
    a computer electrically connected to said network and configured to communicate with said network; and
    a file transfer subsystem electrically connected to and embedded within said ACM, said file transfer subsystem electrically connected to said network, said file transfer subsystem configured to receive at least one update for said at least one module from said computer using said network and transfer said at least one update for said at least one module to said at least one module without user intervention, wherein the at least one update includes a first update and a second update, said file transfer subsystem includes a file transfer server and a file transfer subsystem memory, and said file transfer server configured to automatically transfer the first update to update one of a firmware and a program within said first module, and said file transfer server configured to automatically transfer the second update to update one a firmware and a program within said second module, wherein said file transfer subsystem is configured to transfer the at least one update via a backplane to update one of the firmware and the program by applying a file transfer protocol.

19. An ACM in accordance with claim 18 wherein said ACM comprises a backplane interface electrically connected to said ACM and the backplane electrically connected to said backplane interface, said backplane configured for connection with said file transfer subsystem.

20. An ACM system in accordance with claim 18 wherein said file transfer server electrically connected to said network, and said file transfer server configured to receive said at least one update for said at least one module from said computer using said network.

21. An ACM system in accordance with claim 20 wherein said file transfer server further configured to transfer said at least one update for said at least one module to said at least one module.

22. An ACM system in accordance with claim 20 wherein said file transfer server further configured to store said at least one update for said at least one module.

23. An ACM system in accordance with claim 20 wherein said file transfer subsystem memory is electrically connected to said file transfer server, said file transfer subsystem memory configured to store said at least one update for said at least one module, said file transfer server configured to retrieve said at least one update for said at least one module from said file transfer subsystem memory.

24. An ACM system in accordance with claim 20 wherein said ACM comprises an ACM central processing unit (CPU), said ACM system memory electrically connected to said file transfer server, said ACM system memory configured to store said at least one update for said at least one module, said file transfer server configured to retrieve said at least one update for said at least one module from said ACM system memory.

25. An ACM system in accordance with claim 23 wherein said file transfer subsystem memory comprises at least one of a read only memory (ROM), a random access memory (RAM), a removable memory, a flash memory, and a compact flash card.

26. An ACM system in accordance with claim 24 wherein said ACM system memory comprises at least one of a read only memory (ROM), a random access memory (RAM), a removable memory, a flash memory, and a compact flash card.

27. An ACM system in accordance with claim 18 wherein said at least one update for said at least one module comprises at least one of a program and data.

28. An ACM system in accordance with claim 18 wherein said at least one module comprises at least one of an input module, an output module, and an input/output (I/O) module.

29. An ACM in accordance with claim 20 wherein said file transfer subsystem further comprises a network interface electrically connected to said file transfer server and configured for connection to said network, said file transfer server configured to receive said at least one update for said at least one module from said computer using said network and said network interface, and send said at least one update for said at least one module to said computer using said network and said network interface.

30. An ACM system in accordance with claim 18 wherein said ACM system comprises a backplane interface electrically connected to said ACM and the backplane is electrically connected to said backplane interface, said backplane configured for connection to said at least one module.

31. An ACM system in accordance with claim 18 wherein said ACM system comprises an external interface electrically connected to said ACM and a cable electrically connected to said external interface, said cable configured for connection with said at least one module.

32. An ACM system in accordance with claim 18 wherein said network comprises the Internet.

33. An ACM system in accordance with claim 20 wherein said file transfer server comprises a file transfer protocol server.

34. An ACM system in accordance with claim 18 wherein a user is required to enter a valid user name and user password to access said ACM system.

35. A method for management and control of an automation control module (ACM) using an ACM system, the ACM system including an ACM having an ACM memory, a network, a computer electrically connected to the network and configured to communicate with the network, at least one module electrically connected to the ACM, a programmable logic controller (PLC), and a file transfer subsystem embedded within the ACM, the file transfer subsystem including a file transfer subsystem memory, said method comprising:

receiving, by the ACM, at least one update for the at least one module from the computer using the network and the file transfer subsystem;

automatically transferring the at least one update for the at least one module from the ACM to the at least one module using the file transfer subsystem; and updating one of a program and a firmware within the at least one module by applying the at least one update to the at least one module, wherein said automatically transferring the at least one update comprises communicating, without user intervention, the at least one update via a backplane to update one of the firmware and the program by using a file transfer protocol.

36. A method in accordance with claim 35 wherein the at least one update includes at least one of a program and data, said method further comprising updating module data with the at least one update using the at least one module.

37. A method in accordance with claim 35 further comprising requiring a user input a valid user name and valid user password into the computer to access the file transfer subsystem.

38. A method in accordance with claim 35 wherein the file transfer subsystem further includes a file transfer server electrically connected to the network, said receiving at least one update for the at least one module from the computer using the network and the file transfer subsystem comprising receiving the at least one update for the at least one module from the computer using the network and the file transfer server.

39. A method in accordance with claim 38 wherein said transferring the at least one update for the at least on module to the at least one module using the file transfer subsystem comprises transferring the at least one update for the at least one module to the at least one module using the file transfer server.

40. A method in accordance with claim 38 further comprising storing the at least one update for the at least one module on the file transfer server.

41. A method in accordance with claim 38 wherein the file transfer subsystem memory electronically connected to the file transfer server, said method further comprising:

storing the at least one update for the at least one module in the file transfer subsystem memory; and retrieving the at least one update for the at least one module using the file transfer server.

42. A method in accordance with claim 38 wherein the ACM includes an ACM central processing unit (CPU) and the ACM memory is electronically connected to the file transfer server, said method further comprising:

storing the at least one update for the at least one module in the ACM CPU memory; and retrieving the at least one update for the at least one module using the file transfer server.

43. A method in accordance with claim 38 wherein the file transfer subsystem further includes a network interface electrically connected to the file transfer server and configured for connection to the network, said receiving the at least one update for the at least one module from the computer using the network and the file transfer server comprising receiving the at least one update for the at least one module from the computer using the network, the network interface, and the file transfer server.

44. A method in accordance with claim 39 wherein the ACM system further includes a backplane interface electrically connected to the ACM and the backplane is electrically connected to the backplane interface and the at least one module, said transferring the at least one update for the at least one module to the at least one module using the file transfer server comprising transferring the at least one update for the at least one module to the at least one module using the file transfer sewer, the backplane interface, and the backplane.

45. A method in accordance with claim 39 wherein the ACM system further includes an external interface electrically connected to the ACM and a cable electrically connected to the external interface and the at least one module, said transferring the at least one update for the at least one module to the at least one module using the file transfer server comprising transferring the at least one update for the at least one module to the at least one module using the file transfer server, the external interface, and the cable.

46. An automation control module (ACM) comprising:
an ACM central processing unit (CPU) including a programmable logic controller (PLC);
an ACM CPU system memory; and
a file transfer system comprising a file transfer system memory different from said ACM CPU system memory, said file transfer system electrically connected to said ACM CPU, said system embedded within said ACM, and configured to receive at least one update for said ACM from a network and automatically transfer said at least one update to at least one of said ACM CPU and said ACM CPU system memory, wherein at least one of said ACM CPU and ACM CPU system memory configured to update a program within the ACM CPU by using the at least one update, wherein said file transfer system is configured to automatically transfer at least one update via a backplane to update a program within at least one input/output module by applying a file transfer protocol, said at least one input/output module electrically connected to said ACM.

47. An ACM in accordance with claim 46 wherein said file transfer system comprises a file transfer server electrically connected to said ACM CPU and the network, said file transfer server configured to receive at least one update for said ACM CPU from the network.

48. An ACM in accordance with claim 47 wherein said file transfer server configured to transfer at least one update for said ACM CPU to at least one of said ACM CPU and said ACM CPU system memory.

49. An ACM in accordance with claim 46 wherein said at least one update for said ACM CPU comprises at least one of a program and data.

50. An ACM in accordance with claim 1 wherein the at least one module comprises a first module and a second module and the at least one update comprises a first update and a second update, and said file transfer system configured to transfer the first update via the backplane to the first module and transfer the second update via the backplane to the second module.

* * * * *

UNITED STATES PATENT AND TRADEMARK OFFICE
CERTIFICATE OF CORRECTION

PATENT NO. : 7,433,968 B2 Page 1 of 1
APPLICATION NO. : 10/388147
DATED : October 7, 2008
INVENTOR(S) : Chambers et al.

It is certified that error appears in the above-identified patent and that said Letters Patent is hereby corrected as shown below:

In Column 8, Line 28, in Claim 39, delete "on" and insert -- one --, therefor.

In Column 9, Line 2, in Claim 44, delete "sewer," and insert -- server, --, therefor.

Signed and Sealed this

Twenty-first Day of April, 2009

JOHN DOLL
*Acting Director of the United States Patent and Trademark Office*